Figure 1:
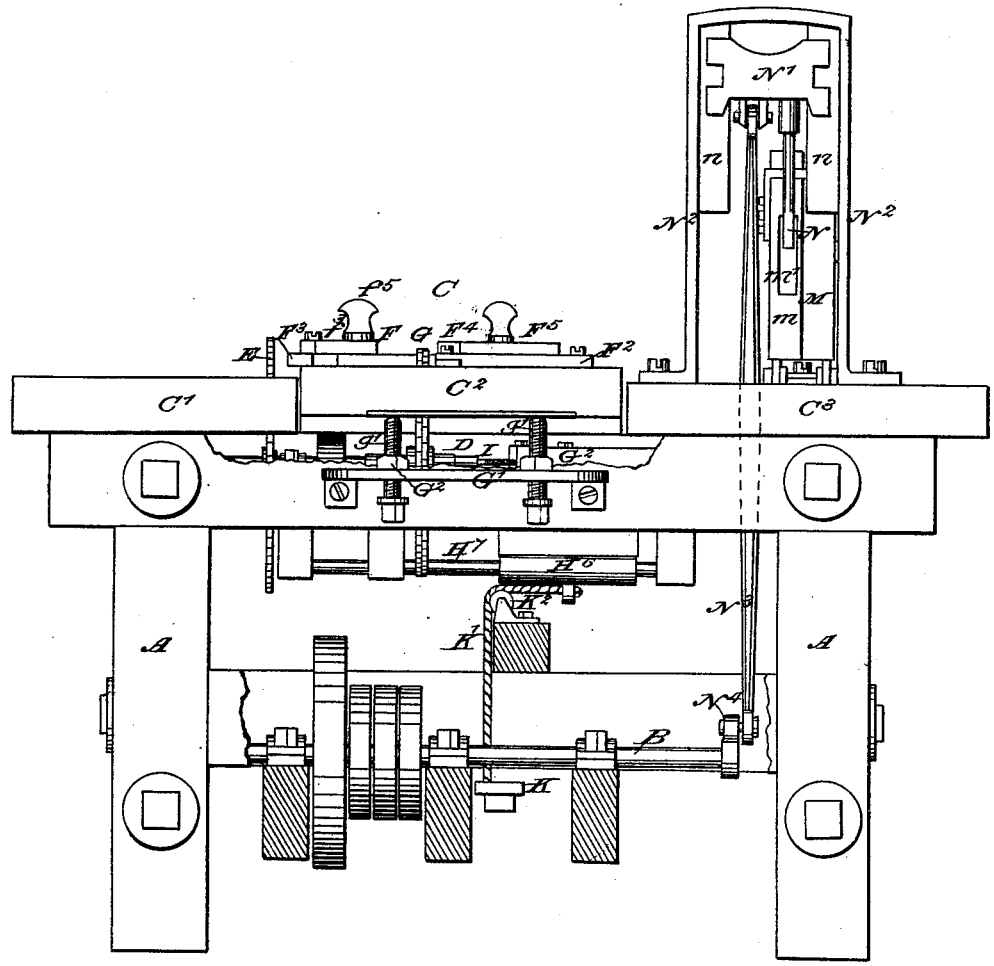

4 Sheets—Sheet 1.

B. F. BARKER.
Machine for Making Plane-Stocks.

No. 219,900. Patented Sept. 23, 1879.

Witnesses:
E. B. Bolton
Chas. C. Stetson

Inventor:
Benjamin F. Barker
by his attorney
Thomas D. Stetson

B. F. BARKER.
Machine for Making Plane-Stocks.

No. 219,900. Patented Sept. 23, 1879.

4 Sheets—Sheet 3.

B. F. BARKER.
Machine for Making Plane-Stocks.

No. 219,900. Patented Sept. 23, 1879.

Witnesses:
E. B. Bolton
Chas. C. Stetson

Inventor:
Benjamin F. Barker
by his attorney
Thomas F. Stetson

B. F. BARKER.
Machine for Making Plane-Stocks.

No. 219,900. Patented Sept. 23, 1879.

UNITED STATES PATENT OFFICE.

BENJAMIN F. BARKER, OF CURTISVILLE, MASSACHUSETTS.

IMPROVEMENT IN MACHINES FOR MAKING PLANE-STOCKS.

Specification forming part of Letters Patent No. 219,900, dated September 23, 1879; application filed January 16, 1879.

*To all whom it may concern:*

Be it known that I, BENJAMIN F. BARKER, of Curtisville, Berks county, in the State of Massachusetts, have invented certain new and useful Improvements in Machinery or Apparatus for the Manufacture of Plane-Stocks, of which the following is a specification.

According to my invention, I construct a substantial frame capable of supporting the various operating parts, upon the upper surface of which is attached, by hinges or other suitable retaining means, a table which, by preference, is divided into three or any other suitable number of sections. Beneath this table I mount a driving-shaft provided with pulleys and cranks for operating, by means of suitable connections, the cutting devices hereinafter more fully explained.

Above the driving-shaft I mount another shaft capable of being driven by a band or other suitable connection from the main shaft, and upon this shaft I mount a circular saw, and also one or more circular grooving-saws or cutters, and a boring-tool.

The sections of the table are provided with suitable apertures for the free passage therethrough of such part of the cutting saws or tools and operating parts as may be necessary.

Upon the upper surface of the table is mounted a compound guide adapted to gage the position at which the circular saw and the circular grooving saw or saws or cutters shall operate upon the wood to form a plane-stock.

Beneath the table is also supported, on suitable guides, a compound slide adapted to hold the plane-stock being formed in such a position during such times as it is being operated upon by the boring-tool to form such parts of the same as are capable of being constructed by boring.

The compound slide is formed in several parts, which are adjustable, so as to be readily adapted for holding stocks of different thicknesses, and also holding the said stock at different angles, so that holes may be cut in them by the boring-tool in the proper position.

The compound slide, with the stock held thereby, is moved toward the boring-tool by means of a treadle or similar motion, and is borne therefrom by means of a spring or weight and pulley.

The section of the table through which the circular grooving saws or cutters pass is adjustable vertically at one end by means of set-screws carried by a bracket or other suitable means supported by the main frame, the object of this adjustment being to regulate the depth to which the grooving saws or cutters shall operate on the stock.

On one section of the table I mount a holder, adapted to receive the stock formed by the devices previously described, in position to be operated upon by a vertical cutter, so as to more completely form the plane bed and mouth.

The holder is supported on a guide pivoted at one end on a shaft carried by a bed-plate, and is adjustable backward and forward, so as to present the stock at the proper angle and at the proper position to be operated upon by the vertical cutter so as to form the plane-bed or the mouth, as may be desired.

The angle and position of the slide are regulated by guides controlled in position by a pair of endless screws. One of the endless screws is mounted in bearings carried by the slide, while the other is controlled in bearings carried by the bed. Both screws are operated by winch-handles. The vertical cutter is mounted in a cross-bar capable of movement up and down in guides, and it has motion communicated to it by means of a connecting-rod operated by a crank affixed on the main driving-shaft.

The following is a description of what I consider the best means of carrying out the invention. The accompanying drawings form a part of this specification.

Figure 2:
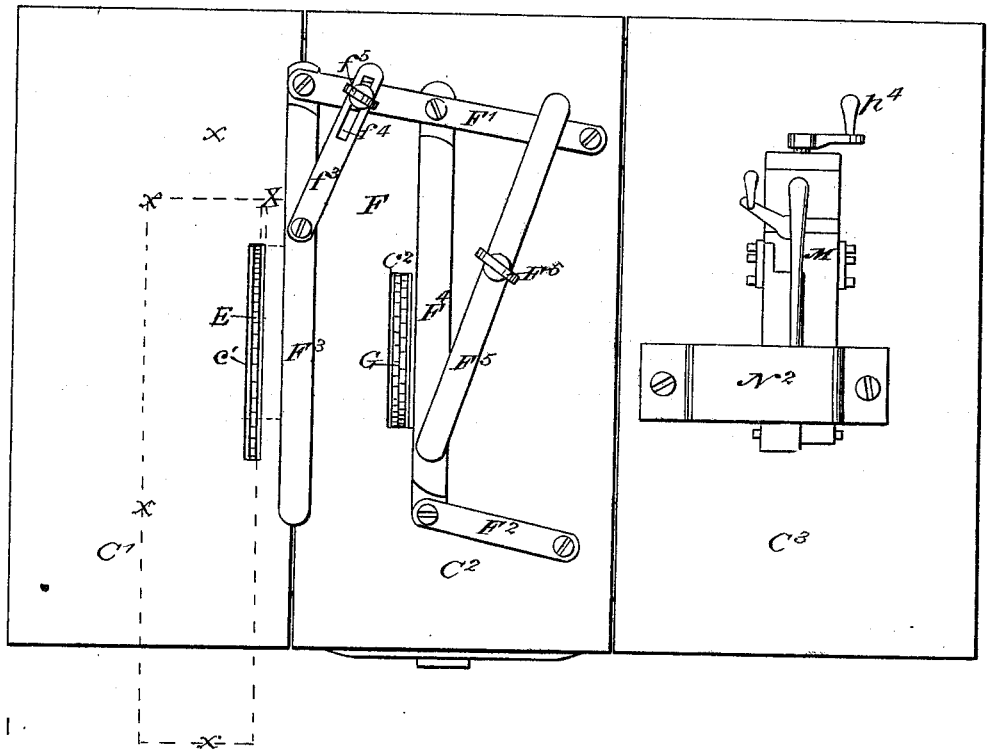
Figure 3:
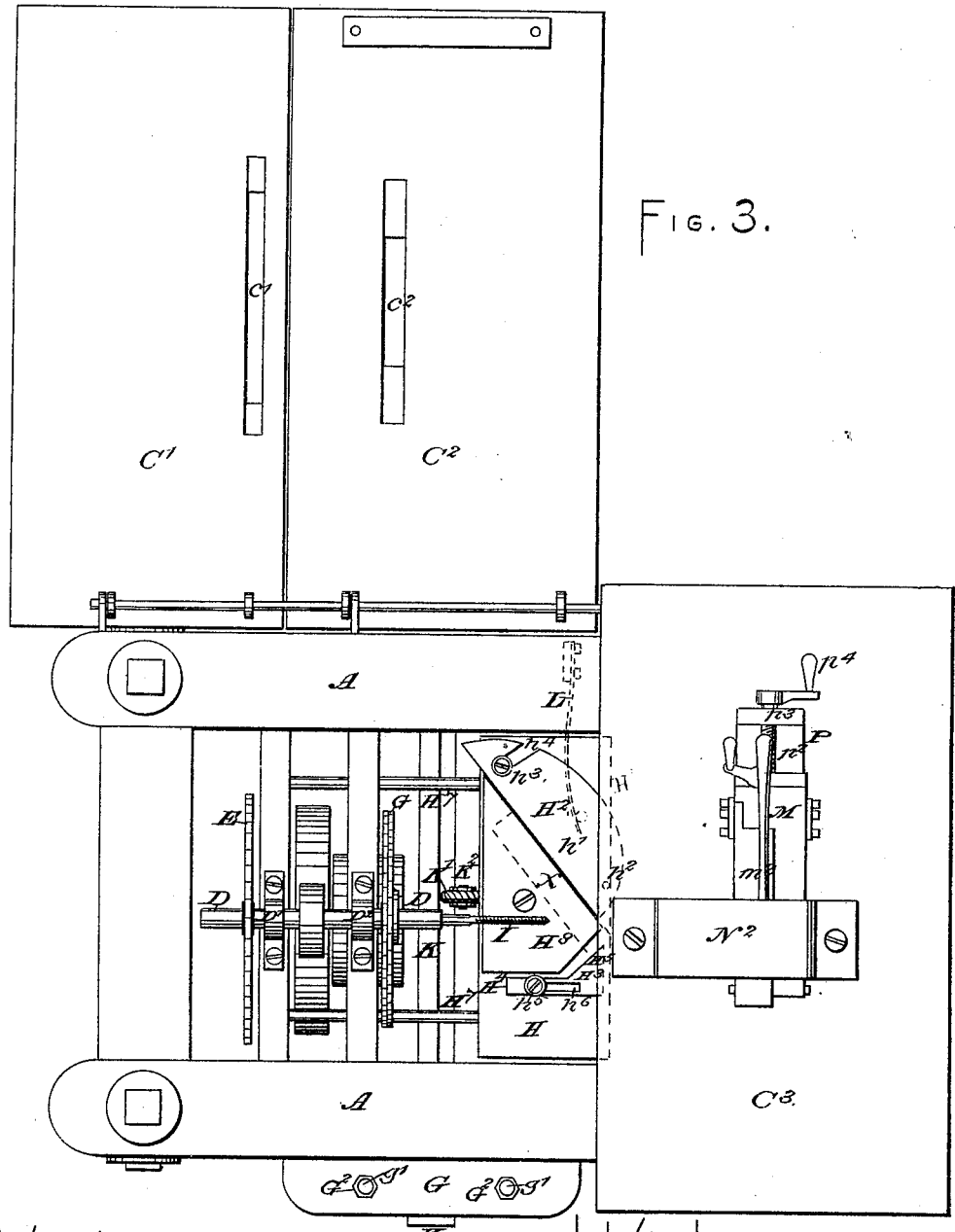
Figure 4:
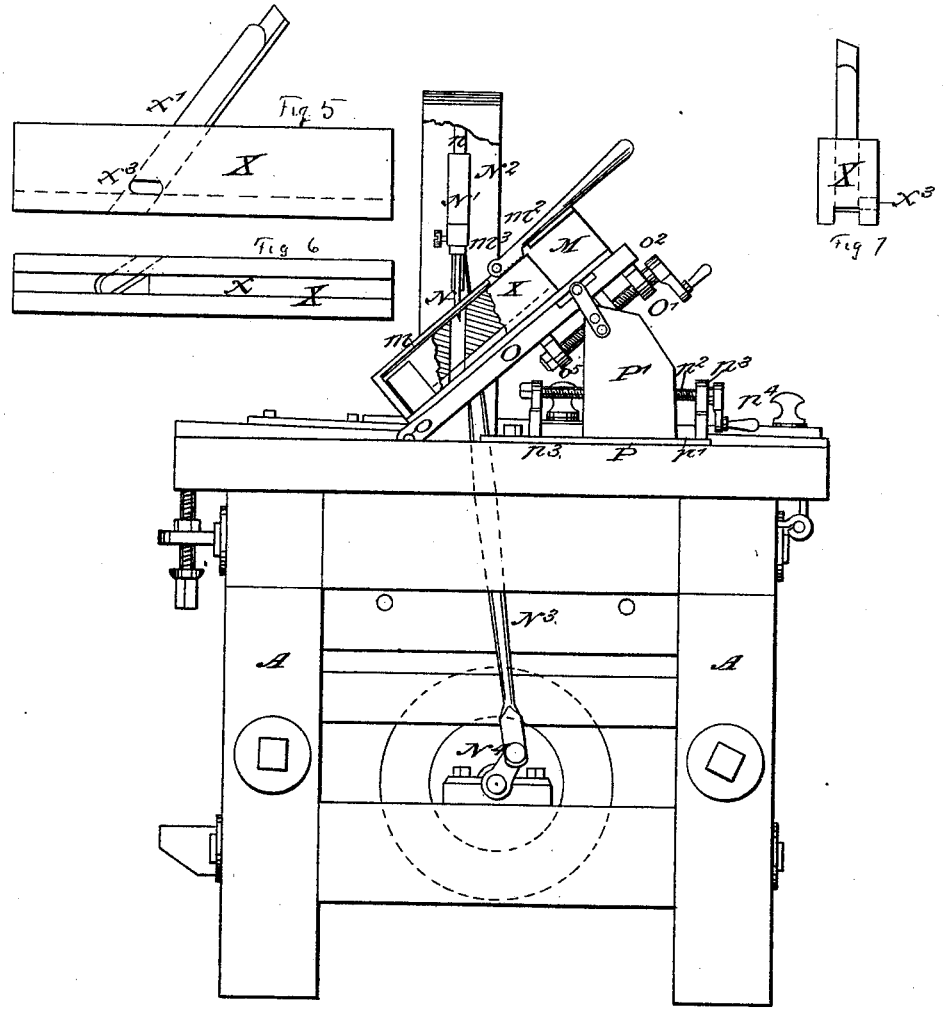

Figure 1 represents a front view. Fig. 2 is a plan of the apparatus constructed according to my invention. Fig. 3 represents a plan view, with two sections of the table and parts connected therewith folded back. Fig. 4 represents an end view of the apparatus. Fig. 5 represents a side view, Fig. 6 an under-side view, and Fig. 7 an end view, of a plane with the stop constructed by my improved device.

Similar letters of reference indicate corresponding parts in all the figures.

A A represent the main framing of the apparatus adapted to support the various operating parts. B represents the main or driving shaft, upon which is mounted a series of pulleys, the operation of which will be more fully explained hereinafter. The framing A supports a table, C, which, by preference, is divided into three sections, $C^1 C^2 C^3$. Beneath the table C, I arrange a shaft, D, mounted in bearings $D^1 D^2$, carried by the framing A. Upon one end of this shaft is mounted, by suitable holding means, a circular saw, E, the upper portion of which passes through a slot, $c^1$, in the section $C^1$ of the table C. F represents a compound guide, which is, by preference, mounted on the section $C^2$ of the table C. This compound guide is formed with a long lever, $F^1$, and a short lever, $F^2$. To the outer end of the lever $F^1$ is connected, by pin-joints, the guide-plate, $F^3$, which is adapted to regulate the breadth of the strip to be cut off from a plank by the circular saw E to form a stock. The guide-plate $F^3$ is retained in any desired position by means of a pivoted holding-piece, $f^3$, provided with an elongated slot, $f^4$, in which works an adjustable screw pin, $f^5$, carried by the lever $F^1$.

$F^5$ is a clamping-bar for the purpose of holding the compound guide F in proper position. This bar is held adjustably in position by means of a tightening-screw, $F^6$, carried by the section $C^2$ of the table C.

G G represent a pair of grooving-saws mounted side by side on the shaft D, as shown, and held in place by nuts and washers or other suitable means. These saws are adapted to act in conjunction with the guide-plate $F^4$ of the compound guide F, to form the countersunk soles in the stocks of various kinds of planes.

The grooving-saws G G pass through the slot $c^2$ in the part $C^2$ of the table C, which is regulated in position by means of set-screws $g' g'$, carried by the bracket $G^1$. These set-screws $g' g'$ are provided with locking-nuts $G^2$, to prevent their being accidentally moved out of position. By raising or lowering the screws $g'$, the distance the saws G project through the section $C^2$ of the table C is regulated, and consequently the depth of the countersunk sole.

In making plane-stocks by my machinery, I first take a plank or board of the desired thickness, and rip the same into strips, as shown by the dotted lines $x x$ in Fig. 2, of a width equal to the depth of the plane-stock when finished, the width of the strips X being regulated by the position of the guide-plate $F^3$. The strips X thus formed are then cut up into sections of the length of a plane-stock, and are then taken by the operator and placed with the face desired for the sole downward, or upon the surface of the section $C^2$, and the guide-plate $F^4$ of the compound guide F having been set at such a distance from the center of the saws G G as to center the piece X, (it is desired for the time to groove,) the said piece X is pushed by hand over the saws G G, care being taken to keep the same true with the guide-plate $F^4$.

After a sufficient number of plane-stock pieces X have been thus treated, the section $C^2$ of the table C is thrown back, as shown by Fig. 3, and the saws G G may then be either removed or suitably guarded to prevent accidents during the subsequent use of the machine. The pieces X are then one by one placed in position upon the compound slide H, as shown by dotted lines in Fig. 3. The slide H, with its piece X, is then pressed toward the boring-tool I, which at the same time is held and rapidly revolved by means of the shaft D, so as to form the forward end or abutment of the bed for the reception of the wedge and iron.

The angle and position at which the boring-tool I shall act on the piece X is regulated by means of the adjustable holding-pieces $H^2 H^3$.

The holding-piece $H^2$ is formed with a straight edge, $h^1$, and is pivoted on a center, $h^2$, carried by the bed $H^1$ of the slide H.

$h^3$ is a set-screw carried by the bed H, and working in a slot, $h^4$, in the piece $H^2$, for the purpose of retaining the piece $H^2$ at any desired angle in relation to the boring-tool I.

The holding-piece $H^3$ is also secured by means of a set-screw, $h^5$, on the bed $H^1$, and is capable of considerable pivotal and lateral motion by means of the elongated slot $h^6$ in its straight portion $H^4$, for the purpose of adjustment to accommodate different lengths of stocks and angles at which the stocks are presented to the boring-tool I.

The holding-piece $H^3$ at its forward end is formed with an angular enlargement or head, $H^5$, adapted to hold the forward end of the stock X while the same is being bored.

The slide H is supported by means of guides $H^6$ upon horizontal rails or bars $H^7$, and it is traversed toward the boring-tool I by means of a treadle, K, which is connected to the under side thereof by means of a strap, $K^1$, passing over a pulley, $K^2$, or by other suitable connection. After being drawn forward, as described, the slide H is drawn backward from the tool I by a spring, L, or other convenient means. After this has been done, when it is desired to produce a stock having a horizontal mouth, the piece X is taken away and the false bed-plate $H^8$ is removed, thereby allowing of a greater depth between the holding-pieces $H^2 H^3$ for the accommodation of the piece X when turned onto its narrow side with its sole upward, in order to produce the horizontal mouth $X^3$ on a line with or close to the sole.

The horizontal mouth $X^3$ is produced by pressing the slide H with the piece X forward against the tool I, as before described in reference to the formation of the abutment $X^1$, except that the tool I is only allowed to penetrate half-way through the piece X. After being thus treated the pieces X are placed one by one in the holder M, which is mounted on the section $C^3$ of the table C in such position as to present the piece X in proper relation to the vertical cutter N, that such cutter may form the bed for the plane-iron to rest on when the wedge is driven in place to hold the iron in position.

The holder M is rectangular in form, and has its front side open for the insertion of the stock to be operated upon. It is also furnished with an elongated slot, $m^1$, in its top plate $m$, for the passage of the vertical cutter N, and a griping-piece, $m^2$, provided with a suitable handle, and pivoted at $m^3$ in such manner that it may project through the plate $m$ and hold the piece X securely in position while being operated upon by the cutter N. The holder M is supported on a guide, O, pivoted at one end on a shaft, $o$, carried by the bed-plate P, and it is adjustable backward and forward, as well as vertically, so as to present the stock at the proper angle and in the proper position to be operated upon by the vertical cutter N, in order to correctly form the plane-bed or the mouth of the stock, as desired. The angle at which the guide O and its holder M is supported is controlled by means of the sliding abutment P' working in guides $p^1$ on the bed-plate P. The abutment P' is traversed to and fro by means of an endless screw, $p^2$, working in bearings $p^3$, and operated by means of the crank-handle $p^4$. The to-and-fro motion of the holder M is obtained by means of the endless screw $O^1$, carried by the bearing $o^2$, formed on or affixed to the guide O, and working in a lug, $o^3$, extending from the under side of the holder M.

The vertical cutter N is carried by a cross-head, $N^1$, sliding vertically in guides $n$ in the casting $N^2$ affixed on the section $C^3$ of the table C. An up-and-down motion is communicated to the cross-head $N^1$ and cutter N by means of the pitman $N^3$, operated by means of the crank $N^4$ affixed on the end of the shaft B.

The cutter N is shown set in the cross-head $N^1$ at an angle so as to form the bed or abutment at an angle; but it may be arranged to form the bed and abutment square and at right angles with the sides of the piece X.

Motion is communicated to the shaft B by means of a strap or band from a steam-engine, or by other suitable means.

Modifications may be made in my device within wide limits by any competent mechanic.

What I claim, and desire to secure by Letters Patent, is—

1. The combination, with the table C and saws E G, of the compound guide F, with bars for gaging the work with reference to the saws, the said bars being connected with each other substantially as and for the purposes described.

2. A compound guide composed of two parallel bars pivoted to the work-table, a guide-bar connected at opposite ends with said bars by a loose joint, a second guide-bar pivoted at the end of one of said parallel bars, devices for adjustably-securing the last-named guide-bar at a desired angle with reference to the parallel bar, and means for clamping and holding the aforesaid system of bars in position on the work-table, substantially as described.

3. The combination, with the grooving-saw G and pivoted adjustable section $C^2$, of the compound guide F and clamping-bar $F^5$, substantially as and for the purpose described.

4. The combination, with the boring-tool I, of the compound slide H, having the adjustable piece $H^2$ for sustaining the piece of which the plane-stock is made at the side, and the adjustable piece $H^3$ for holding it at the end, substantially as described.

5. In a plane-stock machine, a horizontal compound feeding-slide, H, having a pivoted holding-piece, $H^2$, formed with a straight edge, $h^1$, and capable of angular adjustment, as shown, and a sliding holding-piece, $H^3$, formed with an angular enlargement, $H^5$, substantially as shown and described.

6. The combination, with the boring-tool I and horizontal feeding-slide H, of the pivoted holder $H^2$, sliding holder $H^3$, and false bed-plate $H^8$, substantially as and for the purposes set forth.

7. The combination, with the table C and vertical cutter $N^1$, of the holder M, griping-piece $m^2$, pivoted guide O, bed-plate P, sliding abutment P', and adjusting-screws $o^1$ $p^2$, substantially as set forth.

In testimony whereof I have hereunto set my hand this 2d day of December, 1878, in the presence of two subscribing witnesses.

BENJAMIN F. BARKER.

Witnesses:
H. J. DUNHAM,
C. H. WILLIS.